(12) United States Patent
Yagyu

(10) Patent No.: US 8,113,661 B2
(45) Date of Patent: Feb. 14, 2012

(54) PROJECTION-TYPE DISPLAY APPARATUS

(75) Inventor: Shinji Yagyu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 299 days.

(21) Appl. No.: 12/487,996

(22) Filed: Jun. 19, 2009

(65) Prior Publication Data

US 2010/0002195 A1    Jan. 7, 2010

(30) Foreign Application Priority Data

Jul. 1, 2008    (JP) ................. 2008-172633

(51) Int. Cl.
*G03B 21/14* (2006.01)
(52) U.S. Cl. .......... 353/31; 353/119; 353/122; 385/133; 385/901
(58) Field of Classification Search .......... 353/31, 353/34, 37, 121, 122, 94; 349/62; 362/553, 362/555; 385/15–94, 133, 901; 348/742, 348/743, 771
See application file for complete search history.

(56) References Cited

U.S. PATENT DOCUMENTS

| 7,077,528 | B1 * | 7/2006 | Bowron et al. | 353/78 |
| 7,281,807 | B2 * | 10/2007 | Plut | 353/119 |
| 2006/0044523 | A1 * | 3/2006 | Teijido et al. | 353/53 |
| 2010/0034225 | A1 * | 2/2010 | Yagyu | 372/34 |
| 2010/0073638 | A1 * | 3/2010 | Yagyu | 353/31 |
| 2010/0182573 | A1 * | 7/2010 | Itoh et al. | 353/30 |

FOREIGN PATENT DOCUMENTS

| JP | 2000-131665 A | 5/2000 |
| JP | 2006-91867 A | 4/2006 |

* cited by examiner

*Primary Examiner* — William C Dowling
(74) *Attorney, Agent, or Firm* — Birch, Stewart, Kolasch & Birch, LLP

(57) ABSTRACT

A projection-type display apparatus includes an optical engine that forms an image with a laser beam from a laser light source; and an optical fiber that connects the laser light source and the optical engine. The optical engine includes a rod integrator that equalizes an optical-intensity distribution of the light beam output from the laser light source, and a rod fiber-fastening unit that fastens the rod integrator and the optical fiber to face each other such that a gap between an input facet of the rod integrator and an output facet of the optical fiber is large relatively to a wavelength of the light beam propagating through the optical fiber.

4 Claims, 2 Drawing Sheets

PROJECTION-TYPE DISPLAY APPARATUS

BACKGROUND OF THE INVENTION

1. Field of the Invention

The present invention relates to a projection-type display apparatus that employs a liquid-crystal shutter system for three-dimensional image viewing.

2. Description of the Related Art

In a conventional projection-type display apparatus such as one disclosed in Japanese Patent Application Laid-open No. 2006-91867, an incoherent and relatively low luminescence light source, such as a mercury lamp or a light-emitting diode (LED), is used. On the other hand, a laser beam is superior in terms of directivity and luminescence, and therefore a laser is preferable as a light source for the projection-type display apparatus. A projection-type display apparatus has been developed that includes a laser light source as an ideal point light source with excellent focusing property and an optical engine that is made suitable for a low-profile design of the projection-type display apparatus by making an optical system compact, which is disclosed, for example, in Japanese Patent Application Laid-open No. 2000-131665.

Using a light source that is superior in focusing property, such as a laser light source, enables the optical system to be made compact, thereby facilitating a low-profile design of the projection-type display apparatus. However, a space is required in the apparatus for arranging components such as a laser light source, a power supply circuit, and a signal processing circuit, which interferes with a low-profile design of the apparatus.

In recent years, a demand for viewing three-dimensional images with a large projection-type display apparatus, particularly, a commercial television product, has been increasing. Among various methods proposed for providing viewing three-dimensional images, the easiest and most inexpensive method is to use liquid-crystal shutter glasses. However, in the projection-type display apparatus using a laser light source, annular color unevenness may appear on a screen when viewed through the liquid-crystal shutter glasses due to strong polarization properties of the laser light source, thus degrading image quality.

SUMMARY OF THE INVENTION

It is an object of the present invention to at least partially solve the problems in the conventional technology.

According to one aspect of the present invention, there is provided a projection-type display apparatus including an optical engine that forms an image with a laser beam from a laser light source; and an optical fiber that connects the laser light source and the optical engine. The optical engine includes a rod integrator that equalizes an optical-intensity distribution of the light beam output from the laser light source, and a rod fiber-fastening unit that fastens the rod integrator and the optical fiber to face each other such that a gap between an input facet of the rod integrator and an output facet of the optical fiber is large relatively to a wavelength of the light beam propagating through the optical fiber.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the embodiments explained here.

Figure 1:
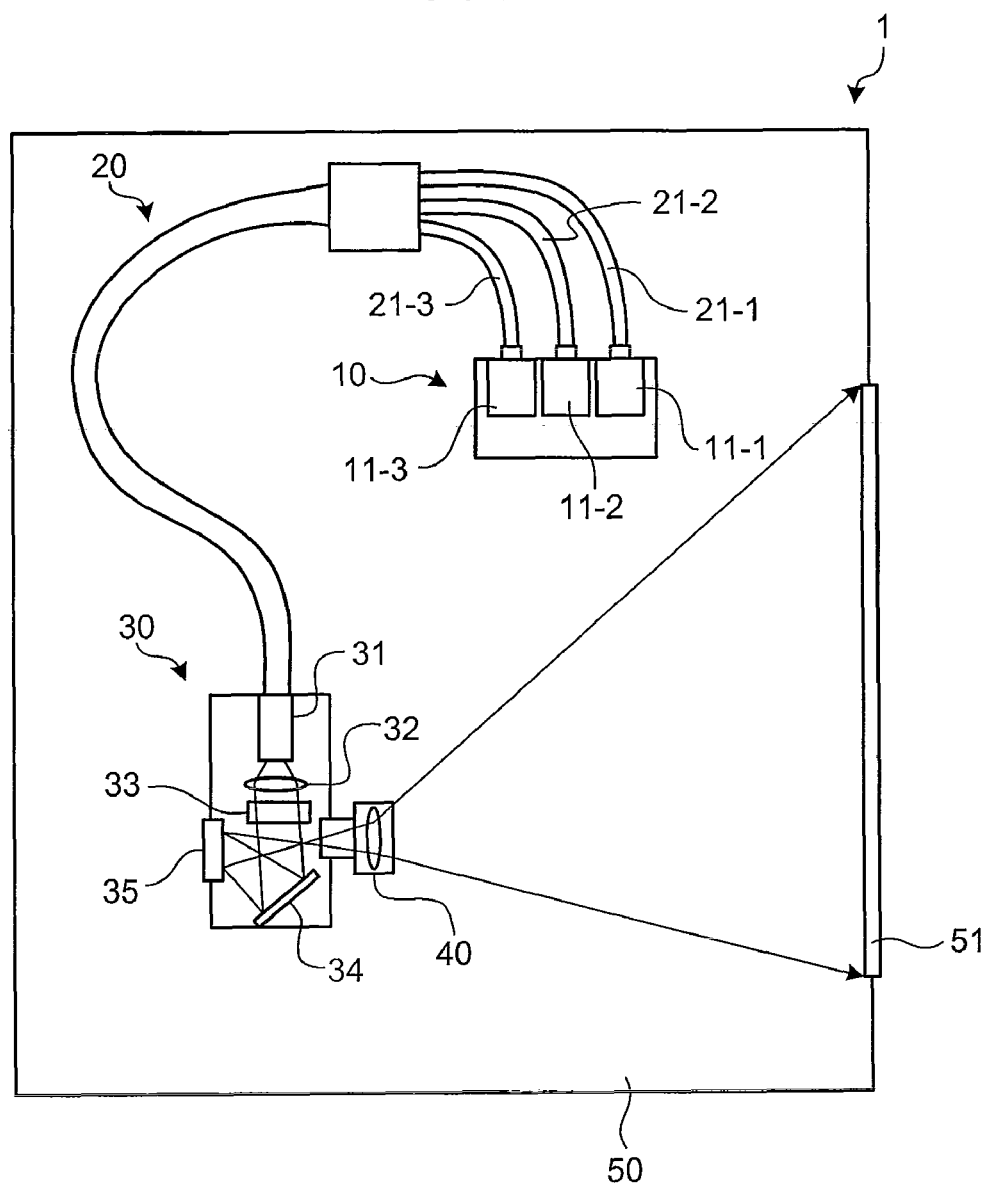
FIG. 1 is a schematic diagram of a projection-type display apparatus according to an embodiment of the present invention.

FIG. 1 is a schematic diagram of a projection-type display apparatus 1 according an embodiment of the present invention. The display apparatus 1 includes a laser light source 10, an optical fiber 20, an optical engine 30, and a magnifying projection lens 40, all of which are encased in a casing 50. A screen 51 is provided on a surface of the casing 50 opposite to the magnifying projection lens 40. An image from the magnifying projection lens 40 is magnified and displayed on the screen 51. Constituent elements of the display apparatus 1 are explained in the order in which they are arranged in the optical path, beginning with the laser light source 10.

The laser light source 10 includes a plurality of light source units 11-1 to 11-3, each corresponding to one color. For example, the light source units 11-1 to 11-3 output red, green, and blue laser beams, respectively.

The optical fiber 20 is formed by bundling a plurality of optical fibers 21-1 to 21-3 provided corresponding to respective light source units 11-1 to 11-3 to make a bundle fiber with a single output facet connected to the optical engine 30. The optical fiber 20 thus forms a laser transmission optical path through which the laser beam from the laser light source 10 is propagated to the optical engine 30.

The optical engine 30 is arranged immediately after the output facet of the optical fiber 20, and includes a rod integrator 31 that equalizes distribution of light intensity of the laser beam, a lens 32 that converges the intensity-equalized light beam and outputs the light beam, a light diffusing unit 33 that includes a rotating optical device that transmits and diffuses the laser beam from the lens 32, a reflecting mirror 34 that reflects the laser beam from the light diffusing unit 33 to a display device 35 causing the laser beam to be irradiated to the display device 35, and the display device 35, which is a reflective light modulation device such as a digital micromirror device (DMD). The magnifying projection lens 40 magnifies the laser beam that is output from the display device 35, and projects it on the screen 51.

The laser light source 10 and the optical engine 30 are connected with the optical fiber 20, so that the flexibility in arrangement of the essential components stored in the apparatus, such as the laser light source 10, power supply circuits, and signal processing circuits, can be improved, and the low-profile display apparatus 1 can be realized.

Because the laser light source 10, which has high focusing property, is used as the light source, the rod integrator 31 is preferred because the apparatus can be made compact by using the rod integrator 31. However, a hollow rod integrator has a metallic reflective film of aluminum or silver on the inside surface because of which short-wavelength light beams are not efficiently propagated. Particularly, when a focal (F) number of the optical system is increased by taking advantage of the focusing property of the laser beam, it is necessary to increase the number of reflections of the laser beam on the metallic reflective surface to obtain a predetermined uniformity. Consequently, there is increased loss of short wavelength light. Furthermore, unlike in the case where a high-pressure mercury lamp or a xenon lamp is used, no ultraviolet rays are produced when the laser light source 10 is used as the light source, and hence there is no need to provide an optical filter for blocking ultraviolet rays. Consequently, because the short wavelength light energy, that is, the blue component of the light, is not lost, a deep blue color can be produced which is not possible in a conventional projection-type display apparatus. However, because the performance required for the optical element in wavelength range is extended to the short wavelength side, the above-described disadvantage of the hollow rod integrator is further increased. Therefore, a solid rod integrator is used as the rod integrator 31 in the present embodiment. The loss of short wavelength light can thus be reduced as compared with the hollow rod integrator.

In the display apparatus 1 configured as described above, the laser beam emitted from the laser light source 10 propagates through the optical fiber 20 that functions as the laser transmission optical path, passes through the optical surface of the light diffusing unit 33, and is irradiated to the display device 35 to form an image thereon. The light beam passes through the magnifying projection lens 40 and is projected on the screen 51 to form a magnified image thereon.

Figure 2:
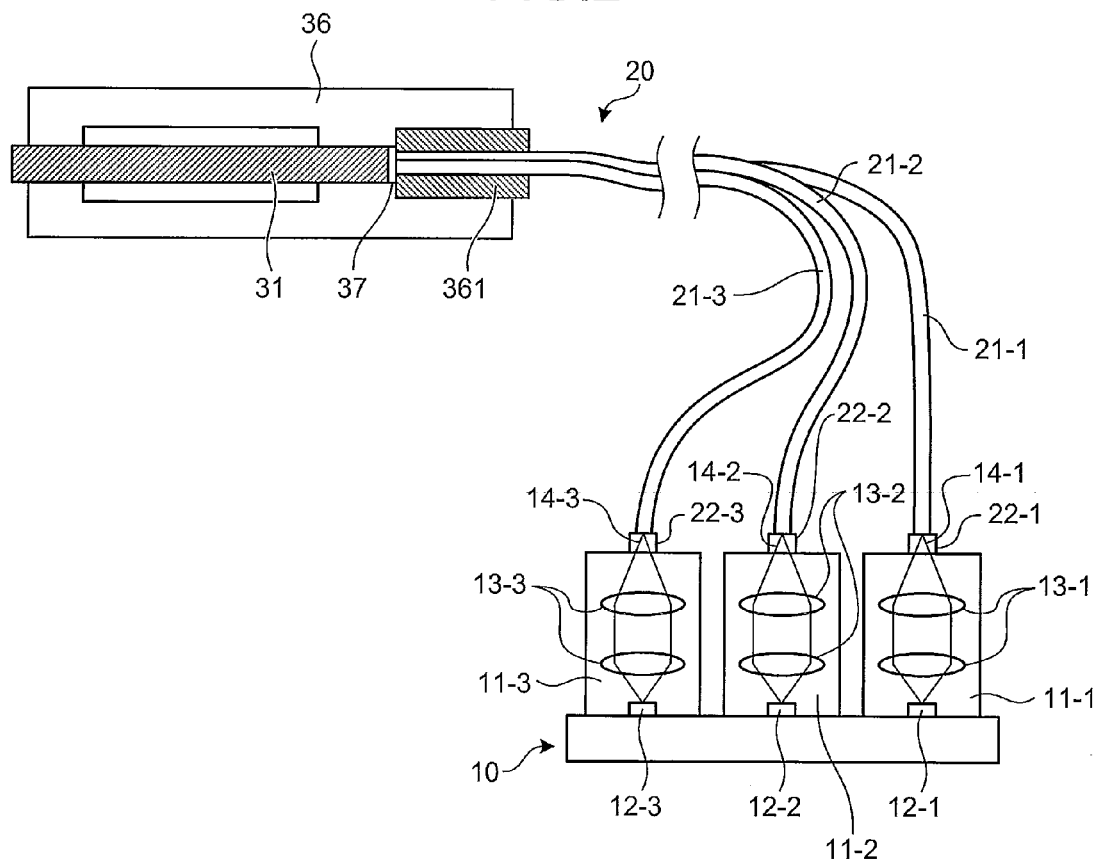
FIG. 2 is a schematic diagram illustrating in detail a connection state of a laser light source and an optical engine with an optical fiber shown in FIG. 1.

FIG. 2 is a schematic diagram illustrating in detail a connection state of the laser light source 10 and the optical engine 30 with the optical fiber 20. The light source units 11-1 to 11-3 include light emitting units 12-1 to 12-3 that emit the laser beam of respective colors, and coupling optical systems 13-1 to 13-3 that converge the light beam emitted from the light emitting units 12-1 to 12-3. Input facets of the optical fibers 21-1 to 21-3 are arranged at optical spots 14-1 to 14-3 of the respective light source units 11-1 to 11-3 for efficient transmission of optical energy.

The light beam transmitted to the optical fibers 21-1 to 21-3 through the coupling optical systems 13-1 to 13-3 is led to the optical engine 30 through the optical fiber 20. At each of the input facets of the optical fibers 21-1 to 21-3, a plastic cladding thereof is removed for a predetermined length. The cladding-removed portion of each of the optical fibers 21-1 to 21-3 is inserted into a corresponding one of input-facet connectors 22-1 to 22-3, and a portion of each of the optical fibers 21-1 to 21-3, which is a predetermined distance away from the input facet and at which the plastic cladding is not removed, is mechanically clamped from outside and a metallic connector is attached thereto.

The optical engine 30 includes a rod fiber-fastening unit 36 in which the optical fiber 20 and the rod integrator 31 are fastened with an air gap 37 therebetween. While the rod integrator 31 is fastened directly in the rod fiber-fastening unit 36, the optical fiber 20 is fastened through a metallic bundling unit 361 that bundles the optical fibers 21-1 to 21-3 running from the laser light source 10 in a rectangular shape.

Figure 3:
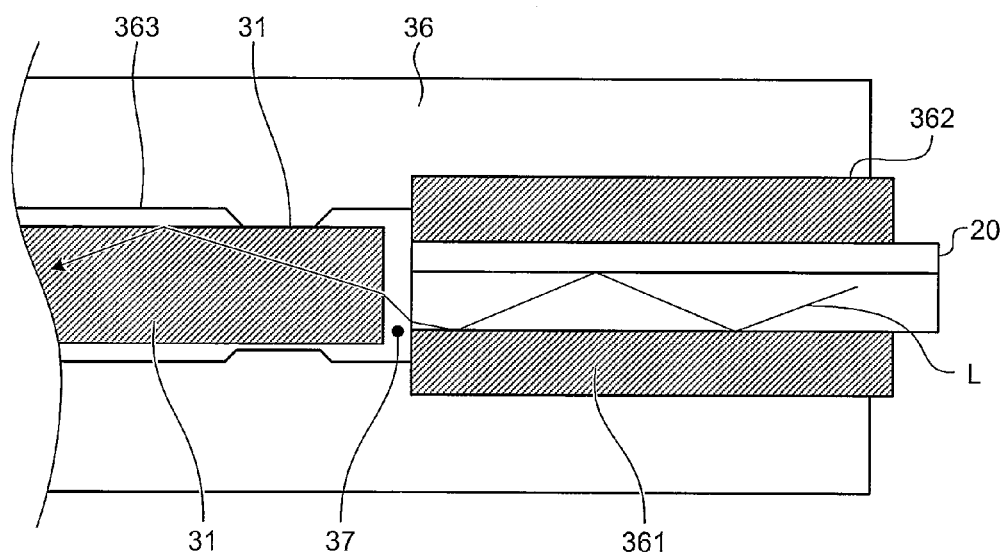
FIG. 3 is a cross-sectional view of a portion of a rod fiber-fastening unit shown in FIG. 1.

FIG. 3 is a cross-sectional view of a portion of the rod fiber-fastening unit 36. At least two substantially rectangular (prismatic form) spaces 362 and 363 of different sizes are formed in the rod fiber-fastening unit 36. Of the two spaces 362 and 363, the space 362 is for fastening the rectangular bundling unit 361, and the space 363 is for fastening the rectangular rod integrator 31.

A substantially rectangular facet (light output facet) of the bundling unit 361 including the optical fiber 20 is larger than a substantially rectangular facet (light input facet) of the rod integrator 31. The outside face of the bundled optical fiber 20 serves as a positional reference face for the bundling unit 361. Thus, the optical fiber 20 and the rod integrator 31 can be accurately positioned in relation to each other in the rod fiber-fastening unit 36.

The rod integrator 31 is fastened in the space 363 in such a way that there is a predetermined clearance between the input facet thereof and the output facet of the optical fiber 20, forming the air gap 37 between the rod integrator 31 and the optical fiber 20. The air gap 37 is large, preferably sufficiently large, relative to a wavelength of the light beam propagating through the optical fiber 20. Specifically, it is preferable from the point of view of assembling that the air gap 37 be 0.1 millimeters (mm) to 0.2 mm.

A laser beam L from the laser light source 10 propagating through the optical fiber 20 as indicated by the arrow shown in FIG. 3, is output from the optical fiber 20 and is input to the rod integrator 31 substantially without leakage, and propagates to the optical system next in line by the total reflection of the laser beam L on the interface of the rod integrator 31.

After setting the optical fiber 20 in the bundling unit 361, the output facet of the bundling unit 361 can be polished to enhance its flatness. The flatness of the input facet of the rod integrator 31 can also be similarly enhanced. However, if the output facet of the bundling unit 361 and the input facet of the rod integrator 31 are to be set touching each other, it would be difficult to ensure that the two concerned facets are perfectly parallel to each other due to the reason that the bundling unit 361 and the rod integrator 31 are set in the rod fiber-fastening unit 36. In other words, it is in practice difficult to cause outer shape factors of respective components, such as a vertical degree of a facet and a side surface and a horizontal degree of a side surface, to be set to ideal values. Therefore, both input and output facets may face with each other slightly in a non-parallel manner, so that it is inevitable that an extremely small air gap is generated therebetween. As a result, interference of light beam occurs at the air gap 37, and when the image is viewed using another polarizing element, annular of color unevenness may be recognized. For example, when viewing a three-dimensional image using polarized glasses (liquid-crystal shutter glasses), annular color unevenness is recognized on the screen, degrading the image quality.

However, in the present embodiment, because the air gap 37 is sufficiently large with respect to the wavelength of the light beam, so that annular color unevenness can be prevented. If the air gap 37 is made larger, the relative dimensions of the rod integrator 31 need to be increased, which would be preferable from the viewpoint of light propagation efficiency. However, an illumination margin for the display device 35, arranged next in line, may become significantly large. Therefore, the air gap 37 should be of an optimum distance taking into account the overall light usage efficiency. The air gap 37 between the bundling unit 361 and the rod integrator 31 also ensures that the respective facets are not damaged by contact with each other when the bundling unit 361 and the rod integrator 31 are set in the rod fiber-fastening unit 36.

According to the present embodiment, the optical fiber 20 and the rod integrator 31 are arranged in the optical engine 30 with the air gap 37 therebetween that is sufficiently larger than the wavelength of the light beam propagating through the apparatus. Consequently, the light beam emitted from the optical fiber 20 does not encounter any interference at the air gap 37. As a result, when the image is viewed using another polarizing element, annular color unevenness is not recognized. In particular, high quality three-dimensional images can be viewed through the polarized glasses in which the liquid-crystal shutter system is employed.

Furthermore, the low-profile display apparatus 1 can be realized by using the laser light source 10 and connecting the laser light source 10 and the optical engine 30 with the optical fiber 20.

According to an aspect of the present invention, annular color unevenness that occur due to a combination of a laser light source that has strong polarization properties and an optical element that has a polarization selection functionality can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection-type display apparatus comprising:
    an optical engine that forms an image with a laser beam from a laser light source; and
    an optical fiber that connects the laser light source and the optical engine, wherein the optical engine includes
    a rod integrator that equalizes an optical-intensity distribution of the light beam output from the laser light source, and
    a rod fiber-fastening unit that fastens the rod integrator and the optical fiber to face each other such that an air gap between an input facet of the rod integrator and an output facet of the optical fiber is sufficiently large with respect to a wavelength of the light beam propagating through the optical fiber such that annular color unevenness is prevented without enlarging an illumination margin for the display apparatus.

2. The projection-type display apparatus according to claim 1, wherein the rod integrator is solid.

3. The projection-type display apparatus according to claim 1, wherein
    the laser light source includes a plurality of light emitting units,
    the optical fiber includes a plurality of optical fibers respectively connected to the light emitting units,
    the input facet of the rod integrator has a rectangular shape,
    the projection-type display apparatus further comprises a bundling unit that bundles the optical fibers such that an output plane of the bundling unit including the optical fibers has a rectangular shape, and
    an area of the output plane of the bundling unit including the optical fibers is larger than an area of the input facet of the rod integrator.

4. The apparatus of claim 1, where the air gap is between 0.1 mm and 0.2 mm.

* * * * *